United States Patent [19]

Lindblom

[11] 3,829,200

[45] Aug. 13, 1974

[54] TEMPLE HINGE SPRING

[75] Inventor: Frank W. Lindblom, Warwick, R.I.

[73] Assignee: Textron Inc., Providence, R.I.

[22] Filed: June 27, 1973

[21] Appl. No.: 373,974

Related U.S. Application Data

[63] Continuation-in-part of Ser. No. 124,293, March 15, 1971, abandoned.

[52] U.S. Cl. .............................. 351/113, 351/121
[51] Int. Cl. ............................................. G02c 5/16
[58] Field of Search ....... 351/113, 121, 123; 16/128

[56] References Cited
UNITED STATES PATENTS
3,619,043   11/1971   Carlyle .............................. 351/113

Primary Examiner—Paul A. Sacher
Attorney, Agent, or Firm—Barlow & Barlow

[57] ABSTRACT

In a spectacle frame a leaf spring is incorporated in the vicinity of each hinge to engage the temples in such a way as to press the temples against the wearer and enable the spectacles to be worn more comfortably without slipping and to be more securely retained in position on the head of the wearer.

4 Claims, 8 Drawing Figures

PATENTED AUG 13 1974  3,829,200

TEMPLE HINGE SPRING

CROSS REFERENCE TO RELATED APPLICATION

This application is a continuation-in-part of my earlier application Ser. No. 124,293 filed Mar. 15, 1971 and now abandoned.

BACKGROUND OF THE INVENTION

A number of devices have been proposed in the prior art to press the temples of a spectacle frame against the head of the wearer. These have taken the form of a number of rubber devices that are designed to be slipped around the temple hinge as, for example, shown in U.S. Pat. No. 2,761,353 or have consisted of a leaf spring such as shown in U.S. Pat. No. 2,550,348 which is attached to the temple hinge itself in such a way as to exert a pressure against the end of the spectacle frame front and in turn bias the temple. This latter approach requires that the device be inserted during the manufacturing assembly of the spectacle frame but it is desirable for many reasons to be able to provide a simple device which can be inserted on existing temples by the unskilled to bias the same against the head of the wearer and yet have a structure which is positive in action and does not detract from the appearance of the spectacle frame.

SUMMARY OF THE INVENTION

The present invention consists of a spectacle frame in which the spectacle frame front temple hinge is recessed in the spectacle front in such a way that merely the barrel portion of the hinge protrudes therefrom. The temple which is to be attached is provided with a hinge with a barrel which mates with the barrel portion of the spectacle front hinge and the plate portion of the hinge that is attached to the temple may be attached in a variety of fashions as, for example, by merely affixing the same to the inner face of the temple. An arched and apertured spring plate is received over the protruding barrel portion of the temple hinge so that the free edges of the arched plate engage against the rearward face of the spectacle front. The arched portion, therefore, will bear against the butt end of the temple once the same is in operative position to be worn and will exert a pressure to press the temple against the wearer. In this fashion the spring is not in operative engagement except when the spectacle is being worn and a gentle pressure by deflection of the arched spring may be had and the spring is only gently stressed by virtue of the flat plate construction which is permitted to flex over a great arc. In this form there is no substantial change in the generally adopted construction of spectacles save the insertion of the apertured, arch flat spring plate over the barrel portion of the spectacle frame front hinge.

DESCRIPTION OF THE PREFERRED EMBODIMENT

Figure 1:
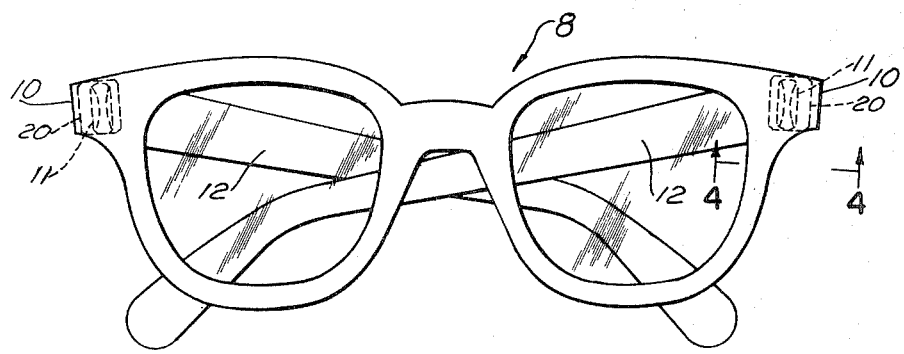
FIG. 1 is a front elevational view of a pair of spectacles embodying the invention.
Figure 4:
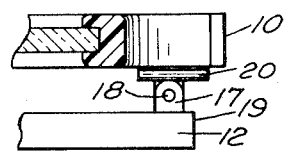
FIG. 4 is a view taken substantially on lines 4—4 of FIG. 1 with the spring in relaxed form.
Figure 2:
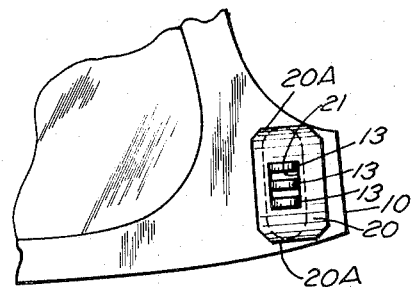
FIG. 2 is a partial rear view of the spectacle front showing the invention in operative relationship to the spectacles.
Figure 5:
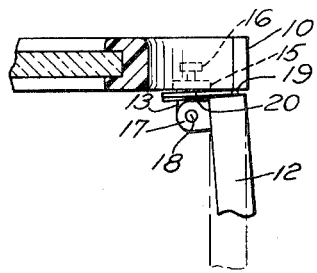
FIG. 5 is a similar view with the temple in operative position and the spring compressed.

The spectacle frame may be made from any suitable material and is herein shown as being made from a plastic material. The frame front designated generally 8 is shown in complete form in FIG. 1. The usual frame front is provided with hinges 11 at each side thereof inwardly of the temporal edge 10 of the front and attached to these hinges are temples 12. As shown more particularly in FIG. 2, the hinges 11 have a number of barrel portions 13 that protrude rearwardly from the frame front 10 and these barrels are attached to a plaque 15 and an embedding arrangement 16 that is captured within the plastic material of the frame front 8 as shown in the embodiments of FIGS. 2, 4 and 5.

The temple 12 is also configured with a hinge means having barrel portions 17 protruding from the inner side wall of the temple, the barrel portions cooperating with the barrel portions 13 by normally passing between the apertures thereof. A suitable hinge pin 18 holds the hinge parts together.

Figures 3, 3A:
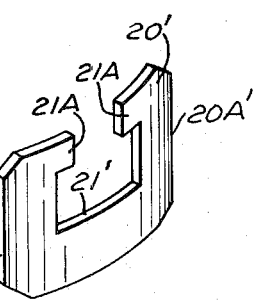
FIG. 3 is a perspective view of the spring of the invention.
FIG. 3A is a perspective view of an alternate form of spring.
Figure 7:
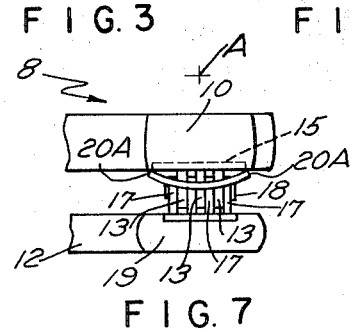
FIG. 7 is a partial end view taken from the right side of FIG. 4.

By referring to FIG. 3, it will be seen that the spring of this invention in its preferred form consists of an arched plate 20 preferably made from a spring-tempered metal having a central aperture 21 therein. The central aperture 21 is made of a size so that it will readily slip over the barrels 13 that protrude from the rear face of the frame front and preferably the aperture has a width dimension so that the side edges of the aperture will snugly embrace the side edges of the barrels 13 as shown in FIGS. 2, 4 and 5. In this manner the arched plate may be readily slipped over the barrels and it is effectively held in position between the back wall of the frame front and the barrel 17 on the temple, the device as illustrated being configured in a seven barrel hinge arrangement. Also it will be quite clear that the arched plate will have a portion thereof that lies between the inner butt end 19 of the temple 12 and the back wall of the frame front. When in position it will be seen that the curvature of the arch extends away from the back wall of the frame front so that the axis of curvature of this arch, which is at point A, FIG. 7, is at right angles or transverse to the axis of the hinge pin. Further the edges 20A of this arched spring plate engage the back wall of the frame front, and as the temple is opened, the butt end thereof is pressed against the top of the arched portion. The pressure on the arched portion of the plate at the top of the arch causes the plate to bend or flex and the bearing ends 20A of the plate slide slightly on the back wall of the frame front. Effectively, therefore, since the edges 20A freely engage the back wall of the frame front, they provide two movable bearing points above and below the hinge pin respectively. The spring tempered metal plate has a lively action, and due to its particular construction exerts a substantially constant force throughout the deflection or flexing process so that the wearer, no matter which size head he happens to have, will not have an uncomfortable or excessive temple pressure exerted on the sides of his head.

With reference to FIG. 3A there has been illustrated a slight modification of the completely apertured spring plate illustrated in FIG. 3. In this embodiment the aperture is not complete but effectively has inturned legs 21A which are of a sufficient length so that the arched spring plate will be secured in position about the barrels 13. In this alternate embodiment the inturned legs will lie on the inner side of the hinge assembly, that is, toward the central portion of the spectacle front, so that the complete arched section will lie outwardly to engage the butt end 19 of the temple 12.

Figure 6:
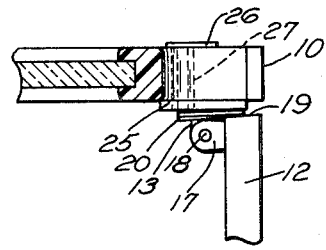
FIG. 6 is a view similar to FIG. 5 of an alternate form of temple hinge to which the spring of the invention may be attached.

By referring to FIG. 6 there is shown an arrangement whereby the temple hinge mounted on the frame front is not an embedded type of hinge but rather consists of a mounting plate 25 which is secured to the rear face of the frame front by the use of a plaque 26 having rivets 27 that are riveted on to the mounting plate 25. The hinge spring member 20 may still fit over the barrels in the same fashion and actually can be adapted to a variety of hinge styles that are in use today.

I claim:

1. In spectacle frames having pivotally coupled temples and a frame front, said pivotal coupling including hinge barrels protruding from the rear face of the frame front inwardly of the temporal edge and hinge barrels protruding from the inner side wall of the temple, said barrels joined by a hinge pin, said temple having an inner butt end adjacent the hinge barrels, a tensioning device for the temples comprising an arched flat spring plate having a central aperture therein that embraces the hinge barrels, said plate having edges that rest on the frame front above and below the hinge pin, the arched spring plate being oriented so that its arched central portion normally protrudes rearwardly from the frame front with its axis of curvature transverse to the axis of the hinge pin whereby the butt end of the temple will normally engage the protruding arched portion of said spring plate.

2. The combination of claim 1 wherein opposite walls of the aperture on either side of the arched central portion of the plate engage hinge barrels protruding from the temple so that the arched spring plate is held in position against the spectacle frame front.

3. Spectacle frame comprising a frame front member, a pair of temples having inner butt ends, hinge means connecting said temples to said frame front member adjacent said ends and comprising a temple member and a frame front member, said hinge means comprising barrels protruding from the rear face of said frame front member and from the inner side wall of each temple, an arched spring plate extending about at least three sides of the protruding barrels of the frame front member, said spring plate being oriented so that its arched central portion normally protrudes rearwardly from the frame front member with its axis of curvature transverse to the hinge axis whereby the butt end of the temple will normally engage the protruding arched portion of said spring plate.

4. A spectacle frame as in claim 3 wherein the spring plate extends about four sides of the protruding barrels of the frame front and engages opposite sides of said protruding barrels.

* * * * *